United States Patent
Liu

(10) Patent No.: US 6,326,950 B1
(45) Date of Patent: Dec. 4, 2001

(54) POINTING DEVICE USING TWO LINEAR SENSORS AND FINGERPRINTS TO GENERATE DISPLACEMENT SIGNALS

(75) Inventor: Wen-Hsiung Liu, Taipei (TW)

(73) Assignee: Primax Electronics Ltd., Taipei Hsien (TW)

( * ) Notice: Subject to any disclaimer, the term of this patent is extended or adjusted under 35 U.S.C. 154(b) by 0 days.

(21) Appl. No.: 09/399,323

(22) Filed: Sep. 20, 1999

(30) Foreign Application Priority Data

Jul. 8, 1999 (TW) .............................................. 88111563 A

(51) Int. Cl.⁷ ...................................................... G09G 5/08
(52) U.S. Cl. ......................... 345/163; 345/164; 345/165; 345/156; 345/157; 345/173
(58) Field of Search ...................................... 345/163, 164, 345/165, 173, 157, 156

(56) References Cited

U.S. PATENT DOCUMENTS

| | | | |
|---|---|---|---|
| 4,936,683 | * 6/1990 | Purcell | 356/152 |
| 5,355,146 | * 10/1994 | Chiu et al. | 345/156 |
| 5,644,126 | * 7/1997 | Ogawa | 250/231.1 |
| 5,909,209 | * 6/1999 | Dickinson | 345/163 |

* cited by examiner

*Primary Examiner*—Xiao Wu
*Assistant Examiner*—Jean Lesperance
(74) *Attorney, Agent, or Firm*—Winston Hsu

(57) ABSTRACT

The invention relates to a pointing device using two linear sensors and fingerprints to generate displacement signals. The pointing device comprises a housing, a linear image input device having first and second linear sensors parallel to each other and installed inside the housing for sensing a linear image and generating corresponding first and second linear image signals, and an image processing circuit installed inside the housing and connected to the two linear sensors for receiving and processing the first and second linear image signals generated by the two linear sensors. When a picture passes by the image input device along a predetermined direction, each of the first and second linear sensors will generate a series of linear image signals, and the image processing circuit will record the two series of the linear image signals respectively, calculate the displacement of the picture according to the two series of linear image signals and generate a displacement signal according to the two series of linear image signals.

15 Claims, 5 Drawing Sheets

$$\left.\begin{matrix}0\ 0\ 1\ 1\ 0\ 1\ 0\ 1\ 0\ 0\\ 0\ 1\ 0\ 1\ 0\ 0\ 0\ 1\ 1\ 0\\ 0\ 0\ 1\ 0\ 1\ 1\ 1\ 1\ 0\ 0\end{matrix}\right\}84$$

86

POINTING DEVICE USING TWO LINEAR SENSORS AND FINGERPRINTS TO GENERATE DISPLACEMENT SIGNALS

BACKGROUND OF THE INVENTION

1. Field of the Invention

The present invention relates to a pointing device, and more particularly, to a pointing device using two linear sensors and fingerprints to generate displacement signals.

2. Description of the Prior Art

A pointing device such as a mouse is used to generate pointing signals to control movements of a cursor on a display device. A prior art pointing device commonly comprises two or three buttons installed in its housing to input button signals. The pointing device is commonly used to scroll a window in the display device. The scrolling of the window in the display device can be performed by moving a scroll square of a scroll bar on the window to another position. This is done by using the pointing device to move the cursor to the scroll square and then depressing one of the buttons on the pointing device. This action grabs the scroll square, permitting it be moved along the direction of the scroll bar by moving the cursor. The direction in which the scroll square moves indicates the direction in which the window will be scrolled: left, right, up or down.

Please refer to FIG. 1 and FIG. 2. FIG. 1 is a perspective view of a prior art pointing device 10. FIG. 2 is a functional block diagram of the point device 10. The mouse 10 is electrically connected to a computer system 20, and the computer system 20 is electrically connected to a display device 22. The mouse 10 comprises a housing 12, two buttons 14 positioned on an upper side of the housing 12 to input button signals, and a roller ball (not shown) installed on a bottom side of the housing 12 for controlling movements of a cursor on the display device 22.

The computer system 20 comprises a memory 24 for storing programs and data, a processor 26 for executing the programs stored in the memory 24, a button control program 28 stored in the memory 24 for receiving and processing the button signals generated by the buttons 14, and a display control program 30 (such as Microsoft Word) stored in the memory 24 which controls the scrolling of a window 32 displayed on the display device 22 according to the button signals.

Many users find the action of scrolling a window inconvenient as it requires fine positioning of the pointing device and button manipulation to grab the scroll square. This action also involves changing the position of the cursor, which can cause inconvenience if the cursor must afterwards be returned to another location on the display device, or is moved from a preferred position.

SUMMARY OF THE INVENTION

It is therefore a primary objective of the present invention to provide a pointing device using two linear sensors and fingerprints to generate displacement signals to solve the above mentioned problems.

In a preferred embodiment, the present invention provides a pointing device comprising:

a housing;

a linear image input device having first and second linear sensors parallel to each other and installed in the top of the housing for sensing a linear image and generating corresponding first and second linear image signals; and an image processing circuit installed inside the housing and connected to the two linear sensors for receiving and processing the first and second linear image signals generated by the two linear sensors;

wherein when a picture passes by the image input device along a predetermined direction, each of the first and second linear sensors will generate a series of linear image signals, and the image processing circuit will record the two series of the linear image signals respectively, calculate the displacement of the picture according to the two series of linear image signals and generate a displacement signal according to the two series of linear image signals.

It is an advantage of the present invention that the pointing device can generate displacement signals by using two linear sensors and fingerprints. These displacement signals can be used as scrolling information. This greatly simplifies the task of scrolling a window and also eliminates the need to change the position of the cursor on the display device.

These and other objectives and advantages of the present invention will no doubt become obvious to those of ordinary skill in the art after having read the following detailed description of the preferred embodiment that is illustrated in the various figures and drawings.

DETAILED DESCRIPTION OF THE PREFERRED EMBODIMENT

Figure 1:
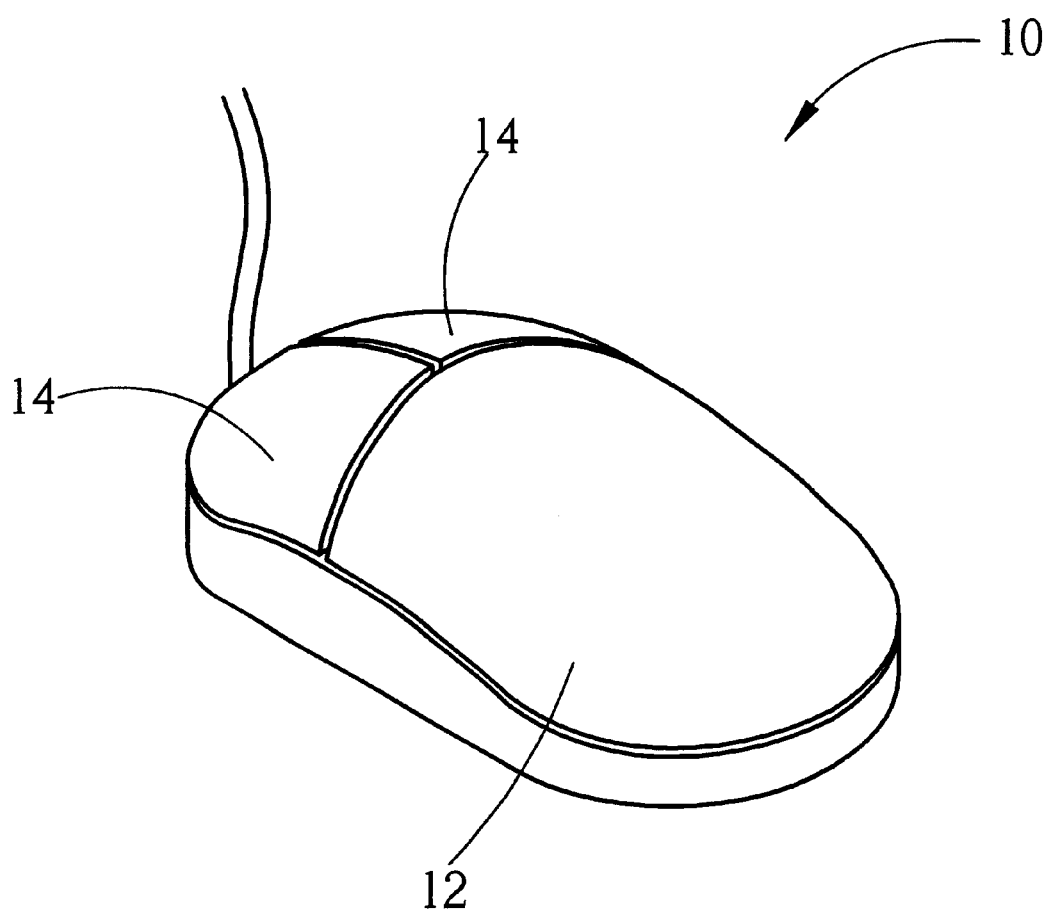
FIG. 1 is a perspective view of a prior art pointing device.
Figure 2:
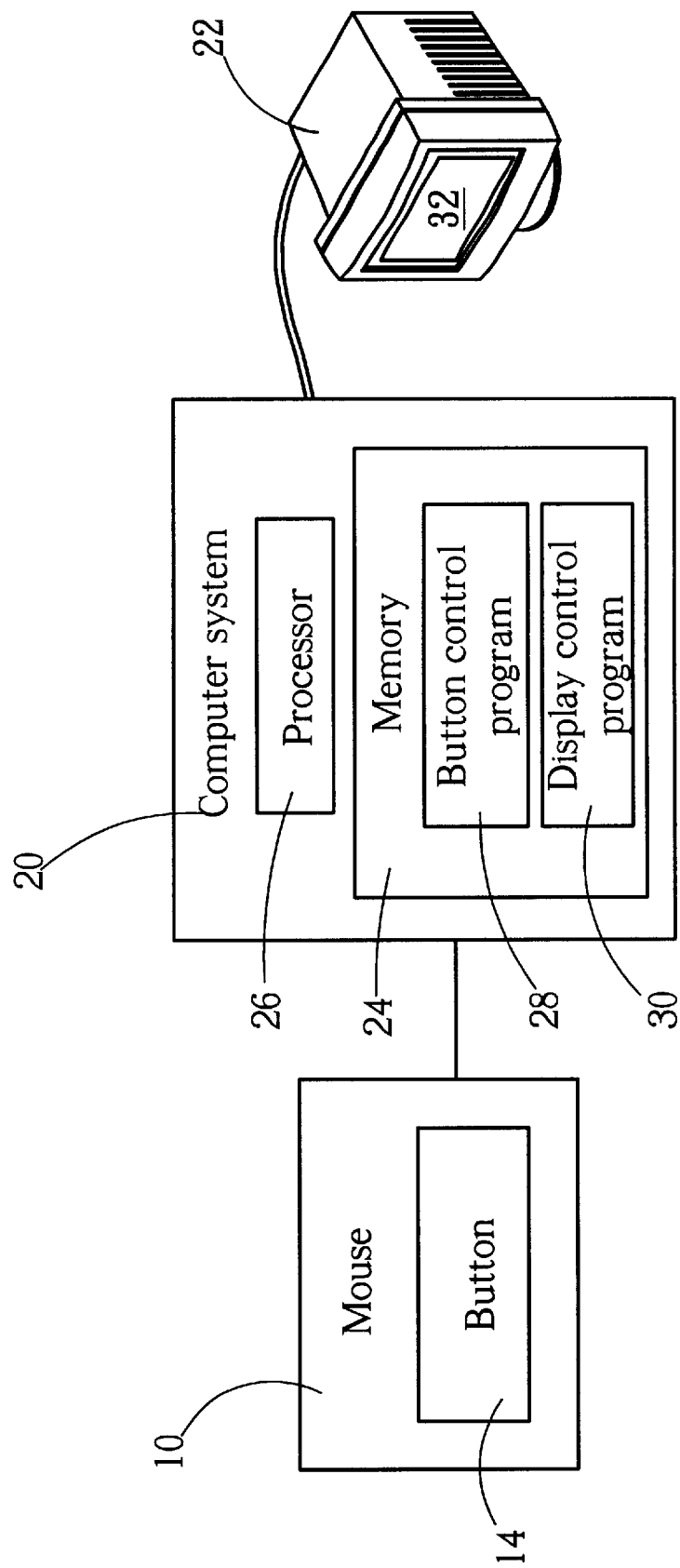
FIG. 2 is a functional block diagram of the pointing device in FIG. 1.
Figure 3:
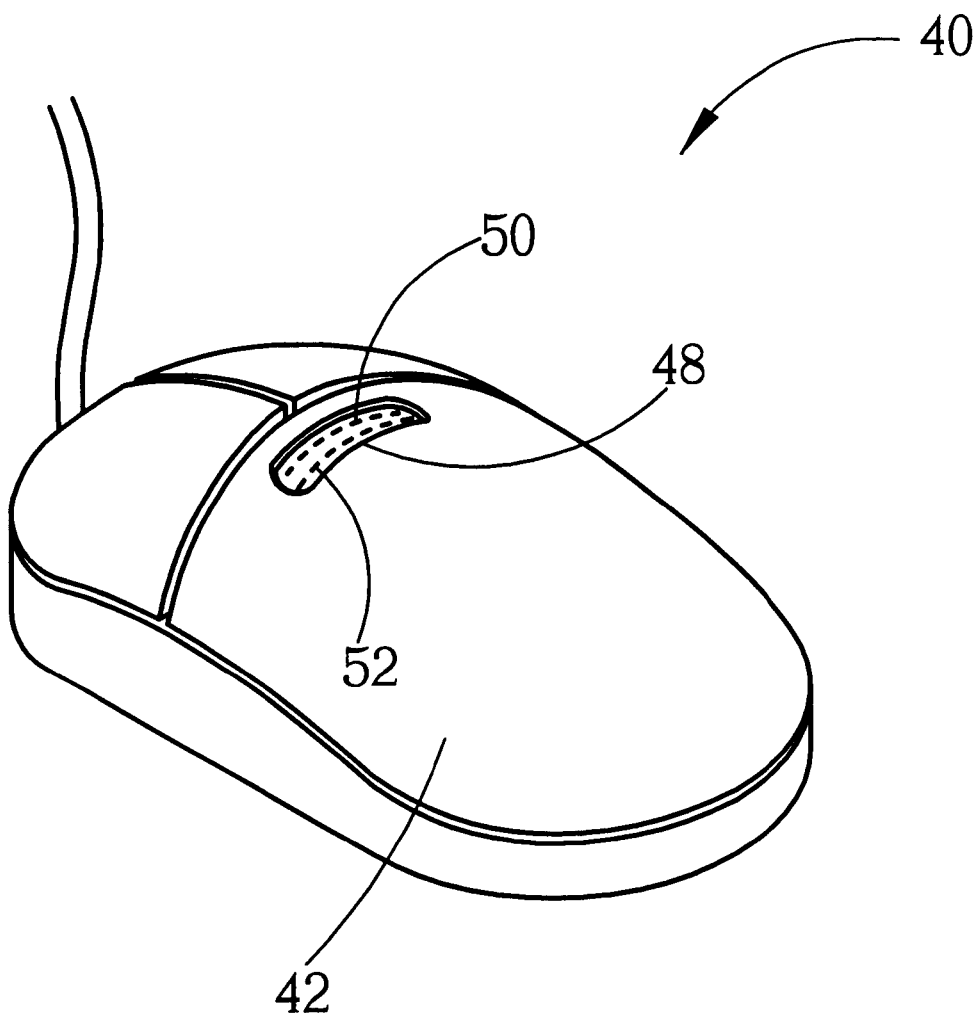
FIG. 3 is a perspective view of a pointing device according to the present invention.
Figure 4:
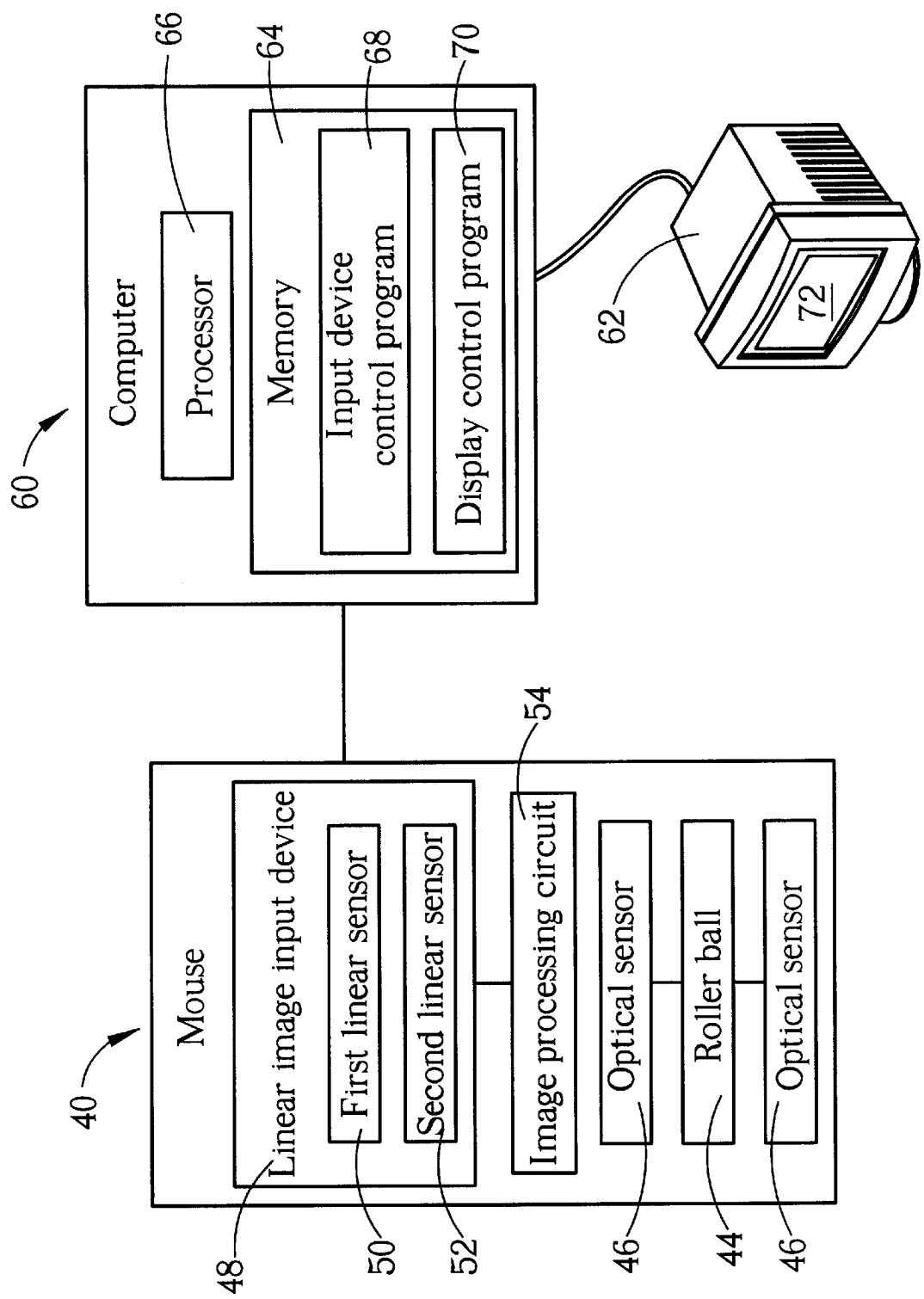
FIG. 4 is a functional block diagram of the pointing device in FIG. 3.

Please refer to FIG. 3 and FIG. 4. FIG. 3 is a perspective view of a pointing device 40 according to the present invention. FIG. 4 is a functional block diagram of the pointing device 40. The pointing device 40 is a mouse, which comprises a housing 42, a roller ball 44 rotatably installed at a bottom of the housing 42, two optical sensors 46 installed inside the housing 42 for sensing the rotations of the roller ball 44 in two orthogonal directions and to generate corresponding two-dimensional pointing signals, a linear image input device 48 installed in the top of the housing 42 for sensing a linear image, and an image processing circuit 54 installed inside the housing 42.

The linear image input device 48 has first and second linear sensors 50, 52 parallel to each other and installed inside the housing 42 for sensing the linear image and generating corresponding first and second linear image signals. The image processing circuit 54 connected to the two linear sensors 50, 52 receives and processes the first and second linear image signals generated by the two linear sensors 50,52, and generates a displacement signal accordingly.

The pointing device 40 is connected to a computer system 60, and the computer system 60 is connected to a display device 62. The computer system 60 comprises a memory 64 for storing programs and data, a processor 66 for executing the programs stored in the memory 64; an input device control program 68, such as a driver for the pointing device 40, stored in the memory 64 for receiving and processing the pointing signals generated by the image processing circuit 54 and a display control program 70, such as Microsoft Word, stored in the memory 64 for controlling the scrolling of a window 72 displayed on the display device 62 according to the pointing signals. The image processing circuit 54 in the pointing device 40 can also be installed in the computer system 60 for receiving and processing the linear image signals generated by the two linear sensors 50,52.

Figures 5, 6:
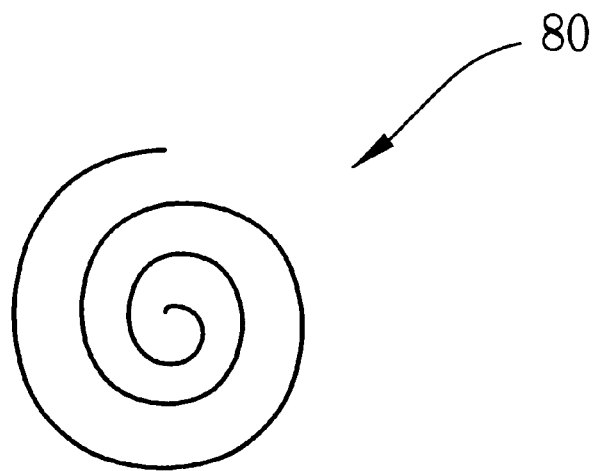
FIG. 5 is a schematic diagram of the fingerprint 80 on a fingertip.
FIG. 6 is a schematic diagram of first and second linear image signals 84, 86 generated by the two linear sensors 50,52 respectively as the fingerprint 80 passes by the linear image input device 48.

Please refer to FIG. 5 and FIG. 6. FIG. 5 is a schematic diagram of a fingerprint 80 on a fingertip. FIG. 6 is a schematic diagram of the first and second linear image signals 84, 86 generated by the two linear sensors 50,52 respectively as the fingerprint 80 passes by the linear image input device 48. When a picture, such as the fingerprint 80 on a fingertip, passes by the image input device 48 along a predetermined direction, the first and second linear sensors 50, 52 will generate two series of linear image signals 84, 86 respectively. Each of the linear image signals generated by the two linear sensors 50, 52 contains a predetermined number of data bits. Different portions of the fingerprint 80 passing by each of the two linear sensors 50, 52 of the image input device 48 generates different linear image signals 84, 86, and the image processing circuit 54 will record the two series of linear image signals 84, 86. For the embodiment, when the fingerprint 80 shifts one unit in the direction from sensor 52 to sensor 50, the first linear sensor 50 will generate a linear image signal (0011010100) followed by (0101000110), and the second linear sensor 52 will generate a linear image signal (0101000110) followed by (0010111100).

When the image processing circuit 54 receives the new linear image signals (0101000110, 0010111100), it will compare each of the new linear image signals with the two previously recorded linear image signals (0011010100, 0101000110) and generate a one-dimensional or two-dimensional displacement signal accordingly. Since the recorded linear image signal (0101000110) generated by the second linear sensor 52 is identical to the new linear image signal (0101000110) generated by the first linear sensor 50, the fingerprint 80 has moved one-unit in the direction from sensor 52 to sensor 50. This can be called the upward direction. The image processing circuit 54 will generate a one-unit upward displacement signal which will, through the input device control program 68 interfacing with the display control program 70, cause the window 72 displayed on the display device 62 to scroll one unit upward.

In another case, when the first linear sensor 50 generates a linear signal (0011010100) followed by (0110101000) and the second linear sensor 52 generates a linear signal (0101000110) followed by (1010001100), the image processing circuit 54 will compare each of the new linear image signals (0110101000, 1010001100) with the two previously recorded linear image signals (0011010100, 0101000110). The new linear image signals are similar to the previously recorded linear image signals by shifting the previously recorded linear image signals (0011010100, 0101000110) one-bit left. This means the fingerprint 80 has moved one unit left. The image processing circuit 54 will generate a one-unit leftward displacement signal and this, in turn, will cause the window 72 displayed on the display device 62 to scroll one unit to the left.

When a user wishes to control the scrolling of the window 72 displayed on the display device 62, all that he needs to do is move his fingerprint past the image input device 48. This will cause the window 72 displayed on the display device 62 to scroll in the direction of movement of the fingerprint 80.

In the contrast to the prior art pointing device 10, the pointing device 40 with the image input device 48 can generate displacement signals for scrolling the window 72 by using two linear sensors 50,52 and the fingerprint 80. This greatly simplifies the task of scrolling the window 72 for the user, and it also permits the cursor position to remain unchanged.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A point device comprising:

a housing;

a linear image input device having first and second linear sensors parallel to each other and installed in the top of the housing for sensing a linear image and generating corresponding first and second linear image signals; and an image processing circuit installed inside the housing and connected to the two linear sensors for receiving and processing the first and second linear image signals generated by the two linear sensors;

wherein when a picture passes by the image input device along a predetermined direction, each of the first and second linear sensors will generate a series of linear image signals, and the image processing circuit will record the two series of the linear image signals respectively, calculate the displacement of the picture according to the two series of linear image signals and generate a displacement signal according to the two series of linear image signals.

2. The pointing device of claim 1 wherein each of the linear image signals generated by the two linear sensors contains a predetermined number of data bits.

3. The pointing device of claim 1 wherein different portions of the picture passing by each of the two linear sensors of the image input device will generate different linear image signals.

4. The pointing device of claim 3 wherein the picture is a fingerprint on a fingertip.

5. The pointing device of claim 1 wherein each of the linear image signals in the two series of linear image signals contains a linear image of the picture, and when the image processing circuit receives a new linear image signal, the image processing circuit will compare the new linear image signal with the two series of the recorded linear image signals to find a specific linear image signal similar or identical to the new linear image signal and generate the displacement signal accordingly.

6. The pointing device of claim 5 wherein the displacement signal can be a one-dimensional or two-dimensional signal.

7. The pointing device of claim 1 further comprising a roller ball rotatably installed at a bottom of the housing, and two optical sensors installed inside the housing for sensing the rotations of the roller ball in two orthogonal directions and generating corresponding two-dimensional pointing signals.

8. A point device connected to a computer system comprising:

a housing; and a linear image input device having first and second linear sensors parallel to each other and installed in the top of the housing for sensing a linear image and generating corresponding first and second linear image signals respectively;

and the computer system comprising an image processing circuit connected to the two linear sensors for receiving and processing the first and second linear image signals generated by the two linear sensors;

wherein when a picture passes by the image input device along a predetermined direction, each of the first and second linear sensors will generate a series of linear image signals, and the image processing circuit will record the two series of linear image signals and generate a corresponding displacement signal according to the two series of linear image signals.

9. The pointing device of claim 8 wherein each of the linear image signals generated by the two linear sensors contains a predetermined number of data bits.

10. The pointing device of claim 8 wherein different portions of the picture passing by each of the two linear sensors will generate a different linear image signal.

11. The pointing device of claim 10 wherein the picture is a fingerprint on a fingertip.

12. The pointing device of claim 8 wherein each of the linear image signals in the two series of linear image signals contains a linear image of the picture, and when the image processing circuit receives a new linear image signal, the image processing circuit will compare the new linear image signal with the two series of the recorded linear image signals to find a specific linear image signal similar or identical to the new linear image signal, and generate the displacement signal accordingly.

13. The pointing device of claim 12 wherein the displacement signal can be a one-dimensional or two-dimensional signal.

14. The pointing device of claim 8 further comprising a roller ball installed at a bottom of the housing, and two optical sensors installed inside the housing for sensing the rotations of the roller ball in two orthogonal directions and generating a corresponding two-dimensional pointing signal.

15. A pointing device of claim 8 wherein the computer system further comprises:

a display device for displaying a window;

a memory for storing programs and data;

a processor for executing the programs stored in the memory;

an input device control program stored in the memory for receiving and processing the displacement signal generated by the image processing circuit; and a display control program stored in the memory for controlling the scrolling of the window on the display device in accordance with the displacement signal.

* * * * *